United States Patent [19]

Hurm et al.

[11] 3,974,130

[45] Aug. 10, 1976

[54] ACRYLONITRILE-VINYLIDENE CHLORIDE COPOLYMERS AND A PROCESS FOR THE PRODUCTION THEREOF

[75] Inventors: Karl Hurm; Wolfhard Schmidt, both of Dormagen, Germany

[73] Assignee: Bayer Aktiengesellschaft, Leverkusen, Germany

[22] Filed: Mar. 27, 1974

[21] Appl. No.: 455,330

Related U.S. Application Data

[62] Division of Ser. No. 211,665, Dec. 23, 1971, abandoned.

[30] Foreign Application Priority Data

Dec. 23, 1970 Germany............................ 2063328

[52] U.S. Cl........................ 260/79.3 MU; 526/328; 526/330; 526/342; 526/343
[51] Int. Cl.²................... C08F 19/00; C08F 23/00; C08F 1/62
[58] Field of Search.............. 260/79.3 MU, 79.3 R, 260/85.5 XA

[56] References Cited
UNITED STATES PATENTS 3,497,476  2/1970  Szita.................................. 260/79.3

Primary Examiner—Christopher A. Henderson, Jr.
Attorney, Agent, or Firm—Plumley and Tyner

[57] ABSTRACT

This invention relates to copolymers of acrylonitrile and vinylidene chloride containing at least 55 % by weight of acrylonitrile and at most 45 % by weight of vinylidene chloride of the kind used for the production of substantially non-flammable textile filaments, which copolymers are distinguished by their outstanding whiteness and high softening temperatures which enable homogeneous spinning solutions particularly suitable for spinning to be prepared. This invention also relates to a process for the production of these copolymers.

1 Claim, No Drawings

ACRYLONITRILE-VINYLIDENE CHLORIDE COPOLYMERS AND A PROCESS FOR THE PRODUCTION THEREOF

This is a division of application Ser. No. 211,665, filed Dec. 23, 1971, now abandoned.

This invention relates to copolymers of acrylonitrile and vinylidene chloride containing at least 55% by weight of acrylonitrile and at most 45% by weight of vinylidene chloride, of the kind used for the production of substantially non-flammable textile filaments, which copolymers are distinguished by their outstanding whiteness and high softening temperatures which enable homogeneous spinning solutions particularly suitable for spinning to be prepared. This invention also relates to a process for the production of these copolymers.

The large-scale production of copolymers of acrylonitrile and vinylidene chloride which are suitable for the production of substantially non-flammable textile filaments, is based fundamentally upon the continuous or batch polymerisation of the monomers in aqueous medium using suitable catalysts. Unfortunately, difficulties are encountered during copolymerisation because the two monomers have different solubilities in water, as a result of which polymers of non-uniform composition, which are incompatible with one another, are easily formed. Consequently polymers of this kind do not form homogeneous, clear solutions of high concentration in the conventional solvents, for example dimethyl formamide. The problem of obtaining uniform copolymers with useful properties for the production of concentrated homogeneous spinning solutions, is tackled in various different ways in conventional polymerisation processes.

If copolymerisation is carried out in aqueous emulsion, copolymers with outstanding solubility in solvents suitable for spinning, for example, dimethyl formamide, are obtained. It is known however, that serious disadvantages arise from the addition of emulsifiers to the polymerisation mixture. The polymer is expensive to work up, because the emulsion has to be precipitated. The unreacted monomers are difficult to recover and the polymers obtained show little thermal stability, i.e. they have a tendency towards yellowing during spinning.

In other processes, polymerisation is carried out in a mixture of water and organic water-soluble solvents, the organic solvent acting as a solution promoter for the vinylidene chloride which is difficult to dissolve in water. Although polymers with useful spinning properties are obtained, the presence of organic solvents brings inevitable disadvantages for instance, the transfer effect of the organic solvents reduces the degree of polymerisation. Moreover, considerable outlay and expense is involved in recovering the organic solvent from the aqueous mixture, and in separating the unreacted monomers.

In another known process involving suspension polymerisation in the absence of emulsifiers, the disadvantages of emulsion polymerisation are avoided. In this process, it is important to add the monomer mixture to a prepared aqueous polymer suspension and to carry out polymerisation, continuously or in batches, in the presence of a polymerisation initiator. This process is economical and gives polymers of outstanding whiteness. Unfortunately, the polymers obtained do not have uniform structure, which results in the concentrated solutions becoming hazy after standing for a while. Highly concentrated solutions of the polymers with solids contents of from 25 to 30 % by weight, as required for example for dry spinning, disproportionate and form a two-phase system. Such polymers are difficult to spin and, for this reason, are unsuitable for the large-scale production of high-grade textile filaments.

It is an object of this invention to provide acrylonitrile-vinylidene chloride copolymers without the abovementioned disadvantages.

This object is accomplished by acrylonitrile copolymers comprising from 55 to 75 % by weight of copolymerised acrylonitrile, from 25 to 45 % by weight of copolymerised vinylidene chloride, and 0 to 10 % by weight of an additional copolymerised comonomer or comonomers, which copolymer has the following properties:

a. a tinting strength value of less than 0.5 (measured on a 13 % by weight solution of copolymer in dimethyl formamide, after treatment for 6 hours at 75°C), b. a solubility index of less than 0.06 (measured on a 30 % by weight solution in dimethyl formamide), and c. a tack point of above 180°C.

The substantially non-flammable polymers according to the invention constitute a new type of acrylonitrile copolymer with outstanding whiteness and a uniform structure which is particularly favourable for the economic production and further processing of spinning solutions. They have considerable advantages in the production of concentrated solutions in such solvents as dimethyl formamide. Whilst polymers with a non-uniform structure form hazy and disproportionate two-phase solutions, which can only be spun with considerable difficulty, the polymers according to the invention make it possible to produce concentrated spinning solutions of outstanding homogeneity and clarity, with little or no expense of the kind likely to damage the polymers. Since, despite high solids contents of 33% by weight or more, relatively short solution times and low solution temperatures are sufficient to homogenise the spinning solutions, the outstanding whiteness of the polymers remains intact during solution so that it is possible to produce pure white filaments by dry spinning. The polymers according to the invention are distinguished by improved thermal stability. The softening temperature and tack point are higher than those of hitherto-known copolymers of the same percentage composition, which makes it possible to produce fibres with improved dimensional stability.

The copolymers according to the invention have a K-value (according to Fikentscher, *Cellulosechemie* 13, (1932), page 58) preferably of from 80 to 105.

It is another object of this invention to provide a process for the production of the afore-mentioned acrylonitrile copolymers.

This object is accomplished by a process, which comprises continuously copolymerising acrylonitrile, vinylidene chloride, and 0 to 10 % by weight of an additional copolymerisable comonomer or comonomers, in an aqueous medium with a polymer content of at least 14 % by weight, the monomer content of the liquid phase being at most 5 % by weight, in the absence of an emulsifier, or solution promoter, polymerisation being catalysed by a water soluble redox system in which the ratio of reduction component to oxidation component is at least 5 : 1 by weight, at a temperature of from 30° to 50°C in a sealed zone under an inert gas at a constant pressure of from 1.3 to 2.0 times the vapour pressure of the vinylidene chloride, the pressure being maintained or increased during continuous removal of the polymer dispersion obtained, and the polymer dispersion not being exposed to a reduction in pressure until the solid polymer has been separated from the liquid phase.

Accordingly, during the continuous removal of the polymer suspension from the polymerisation zone at a rate commensurate with that at which the reaction components are pumped in, the polymer suspension remains in a sealed system in which the excess pressure is at least maintained, or is increased. The polymer suspension is nowhere exposed to a reduction in pressure. To separate the polymer, it is continuously filtered and washed, preferably by pressure filtration and pressure washing carried out at a pressure of from 0.3 to 2 atmospheres.

Polymerisation is carried out in an aqueous medium with a polymer content of at least 14 % by weight, at a pH-value of from 2 to 5, preferably from 2.5 to 3.5, and at a temperature of from 30° to 50°C, preferably from 34° to 40°C. The redox catalyst system used is preferably an alkali metal bisulphite/alkali metal persulphate system in which the ratio by weight of bisulphite to persulphate is from 5 : 1 to 20 : 1, preferably from 5 : 1 to 10 : 1. The monomers are introduced at such a rate that the concentration of monomers in the liquid phase is at most 5 % by weight. A portion of the monomers added is adsorbed by the solid present in the polymer suspension.

The most important features of the process according to the invention are the fact that the reactive polymer suspension, containing neither emulsifiers nor organic solvents as solution promoters for the monomers, is exposed to a pressure which is distinctly above the vapour pressure of the vinylidene chloride, and the fact that the suspension, as it flows from the polymerisation zone to the point at which the pure polymer is separated, is not subjected to any reduction in pressure. This guarantees that at no time is there any evaporation, even under reflux, which could lead to a change in the composition of the monomer fraction present in the liquid and solid phases of the polymer suspension.

In addition to acrylonitrile and vinylidene chloride, other copolymerisable monomers, such as vinyl acetate, and esters of acrylic acid or methacrylic acid, can be used in the production of the polymers according to the invention. It is also possible to use comonomers with a special affinity for dyes, for example methallyl sulphonic acid, styrene sulphonic acid, methacryloyl-amino benzene-benzene disulphimide or their water soluble salts. The comonomer content, apart from the two main constituents, acrylonitrile and vinylidene chloride, should not exceed 10% by weight.

The solubility properties of the copolymers, with a view to producing clear and homogeneous spinning solutions, are characterised by the solubility index, which is measured by the following method:

6 g of polymer are dissolved in 14 g of dimethyl formamide and stirred for 1.5 hours at 70°C. The solution is poured into a 10 mm cell and left standing for 1 hour at 70°C, in order to remove bubbles. After standing for 1 hour at 20°C, the extinction of the bubble-free solution is measured by differential photometry against pure dimethyl formamide, using a Zeiss Photometer Elko III with an S 59 E filter at a layer thickness of 10 mm.

The tinting strength value is measured to characterise the tendency of copolymer solutions towards discoloration when heated. Measurement is carried out as follows:

A 13% by weight solution of the polymer in pure dimethyl formamide is prepared by thoroughly stirring 26 g of copolymer with 174 g of dimethyl formamide in a sealable 500 ml-capacity glass vessel, and vigorously shaking the resulting mixture for 1 hour at room temperature. The solution is then poured into a vessel equipped with stirring mechanism and kept at 75°C for 6 hours, during which a gentle stream of dry air is passed over the surface of the solution. The change in colour which occurs is measured by differential photometry against pure dimethyl formamide, using a Zeiss Photometer ELKO III and an S 42 E filter, at a layer thickness of 50 mm.

To measure the tack point of the polymer powder, glycerine is used as heat transfer agent. A sifted polymer sample is introduced into a heated glycerine bath, and the lowest temperature at which the polymer particles just begin to stick, is measured.

The following Examples are to further illustrate the invention without limiting it.

EXAMPLE 1

Following displacement of the air with nitrogen, 500 liters of desalted water and 50 ml of concentrated sulphuric acid are introduced into a sealed 700-liter-capacity vessel of inert material which is equipped with a gate paddle agitator and with a heating and cooling means and which, for continuous filling, is connected through feed pipes to supply vessels containing the monomers, initiator, sulphuric acid and water. The pressure inside the vessel is adjusted to 1.2 atmospheres, by the introduction of nitrogen. Thereafter, the receiver is heated to 36°C and continuous filling is commenced. The following components are introduced:

10.8 liters per hours of acrylonitrile
4.3 liters per hour of vinylidene chloride
7.5 liters per hour of a 5% by weight aqueous solution of methacryloyl-amino benzene-benzene disulphimide,
2.6 liters per hour of 2.5% by weight sulphuric acid,
4.8 liters per hour of a 0.5% by weight aqueous solution of potassium persulphate,
4.8 liters per hour of a 3% by weight aqueous solution of sodium metabisulphite, and
25 liters per hour of desalted water After the polymerisation vessel has been filled, the polymer suspension that forms is continuously run off through an overflow pipe in the upper part of the vessel, at a rate commensurate with that at which the components are pumped in at the lower end of the vessel. The suspension flows into a second vessel of the same kind in which the pressure is also 1.2 atmospheres. In this vessel, the suspension is stabilised by the addition of 10 liters per hour of a 1% by weight solution of metaphosphoric acid. The second vessel is kept about half full during the test period. The polymer suspension is continuously pumped off from this vessel and delivered into a pressure filter, in which it is continuously filtered and washed under a pressure of 1.2 atmospheres. The continuous polymerisation reaction proceeds uniformly for several days.

The pH-value of the polymer suspension is 2.5, whilst the unreacted monomer content of the liquid phase is 25 g per liter. The polymer has a K-value of from 90 to 91 (as measured on a 0.5% by weight dimethyl formamide solution at 20°C in accordance with Fikentscher, *Cellulose-chemie* 13, page 58, 1932).

The polymer has a solubility index of 0.035, a tinting strength value of 0.45 and a tack point of from 200° to 210°C.

A clear 31% by weight spinning solution in dimethyl formamide is prepared, and filaments with a denier of 30 dtex are spun by the dry-spinning process. The polymer shows extremely good spinning properties and hardly any filament breakages are detected in the spinning duct.

EXAMPLE 2 (COMPARISON TEST)

The test is carried out in a vessel equipped with stirring mechanism in the same way as described in Example 1, except that polymerisation is carried out in the sealed vessel under the natural vapour pressure of the polymerisation system, without any increase in the pressure by the introduction of nitrogen. The polymer suspension that forms is continuously run off at a rate commensurate with that at which the components are run in. The polymer suspension is pumped into a second vessel of the same kind in which there is no excess pressure. In this vessel, the suspension is stabilised as described in Example 1, The polymer suspension is then delivered to a standard arrangement for filtering and washing the polymer. The continuous polymerisation reaction proceeds for several days.

The pH-value of the polymer suspension is 2.5, the unreacted monomer content of the liquid phase is 23 g per liter, and the k-value is between 88 and 90.

The polymer has a solubility index of 0.14, a tinting strength value of 0.8 and a tack point of around 180°C.

A hazy 31% by weight spinning solution in dimethyl formamide is prepared. Filaments with a denier of 30 dtex are spun by the dry-spinning process. Under the same conditions, the spinning properties of the polymer are distinctly poorer than in Example 1. An average of 1 to 2 filament breakages per hour occur in each spinning duct.

EXAMPLE 3 (COMPARISON TEST WITH EMULSIFIER)

2000 ml of desalted water are introduced under nitrogen into a glass vessel which is equipped with a stirring mechanism, heating and cooling means, and a nitrogen supply pipe, followed by the addition with stirring of 1.5 g of sodium lauryl sulphate and 150 g of a monomer mixture consisting of 60.3% by weight of acrylonitrile, 37.2% of vinylidene chloride and 2.5% of methacryloyl-amino benzene-benzene disulphimide. The quantities of monomer are such that a copolymer with the same chemical composition as in Examples 1 and 2 is formed.

The temperature is adjusted to 25°C. Polymerisation is then initiated in the sealed vessel by the addition of 90 ml of a 1% by weight potassium persulphate solution and 90 ml of a 6% by weight sodium metabisulphite solution at a pH value of 2.5.

Polymerisation is terminated after 4 hours and the polymer is precipitated by the addition of sodium chloride solution. The polymer suspension is filtered and the filter cake is washed with water. The polymer has a K-value of 94.

The solubility index is 0.08, the tinting strength value is 1.2 and the tack point is between 170° and 180°C. As the increased tinting strength value implies, the polymer is appreciably less thermally stable than the polymer according to the invention of Example 1.

We claim:
1. An acrylonitrile terpolymer comprising from 55 to 75% by weight of copolymerized acrylonitrile; from 25 to 45% by weight of copolymerized vinylidene chloride; and up to 10% by weight of methallyl sulfonic acid, styrene sulfonic acid, methacryloyl-amino benzene-benzene disulfimide, or a water-soluble salt of said sulfonic acids or said disulfimide, said terpolymer having the following properties:
   a. a tinting strength value of less than 0.5 (measured on a 13% by weight solution of copolymer in dimethyl formamide, after treatment for 6 hours at 75°C),
   b. a solubility index of less than 0.06 (measured on a 30% by weight solution in dimethyl formamide), and
   c. a tack point of above 180°C.

* * * * *